United States Patent [19]

Sako et al.

[11] Patent Number: 5,216,656

[45] Date of Patent: Jun. 1, 1993

[54] METHOD FOR RECORDING A CD-RAM WHICH IS COMPATIBLE WITH A CONVENTIONAL CD RECORDING FORMAT WHILE ALLOWING FAST ACCESSING

[75] Inventors: Yoichiro Sako, Chiba; Tamotsu Yamagami, Kanagawa, both of Japan

[73] Assignee: Sony Corporation, Tokyo, Japan

[21] Appl. No.: 712,940

[22] Filed: Jun. 10, 1991

[30] Foreign Application Priority Data

Jun. 15, 1990 [JP] Japan ............................ 2-157321
Jun. 15, 1990 [JP] Japan ............................ 2-157322

[51] Int. Cl.⁵ .............................................. G11B 7/00
[52] U.S. Cl. ................................... 369/59; 371/51.1
[58] Field of Search ................... 369/111, 59, 44.26, 369/275.3, 109, 59; 371/2.2, 49.1, 51.1

[56] References Cited

U.S. PATENT DOCUMENTS

| | | | |
|---|---|---|---|
| 4,142,209 | 2/1979 | Hedlund et al. | 369/275.3 |
| 4,964,128 | 10/1990 | Sako et al. | 371/39.1 |
| 4,995,026 | 2/1991 | Makabe et al. | 369/275.3 |
| 5,003,527 | 3/1991 | Matsumoto et al. | 369/109 |

Primary Examiner—Donald E. McElheny, Jr.
Attorney, Agent, or Firm—Philip M. Shaw, Jr.

[57] ABSTRACT

A method of recording user data on a DC-RAM disc medium comprising the steps of recording servo signals in a pair of spaced apart servo areas in each one of a predetermined number of segments which form a predetermined number of sectors of each one of a plurality of recording tracks on the disc medium, and recording along a portion of each track, between each servo area, units of 12 bytes of user data and 4 bytes of parities for the user data so that among the predetermined number of segments are a plurality of user data segments each consisting of a servo signal and one or more units of 12 bytes of user data and the parities for the 12 bytes of user data.

8 Claims, 6 Drawing Sheets

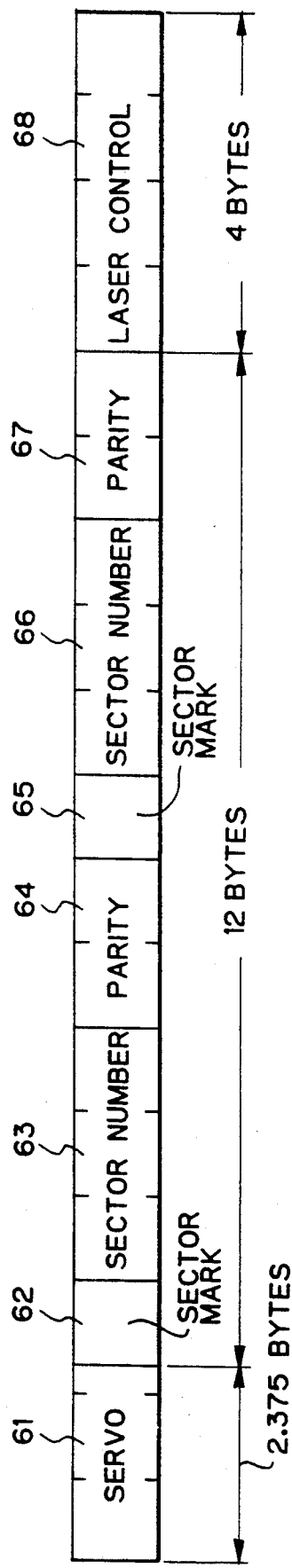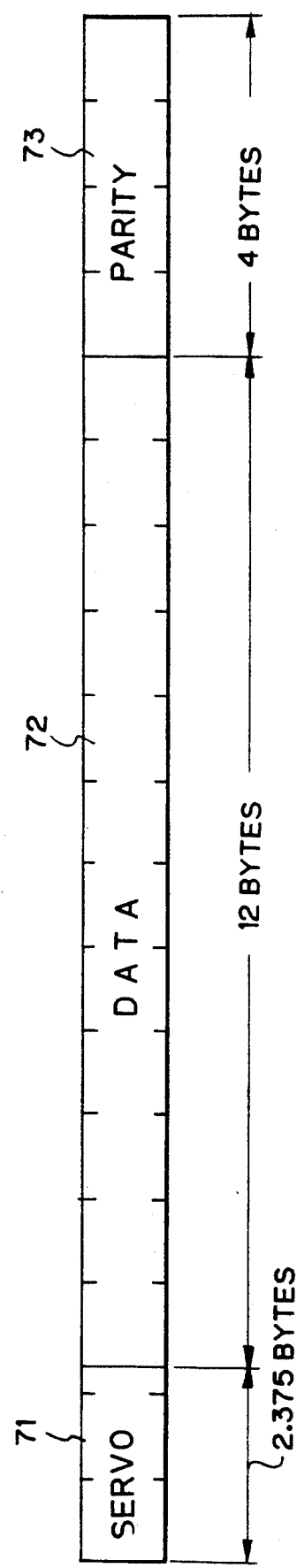

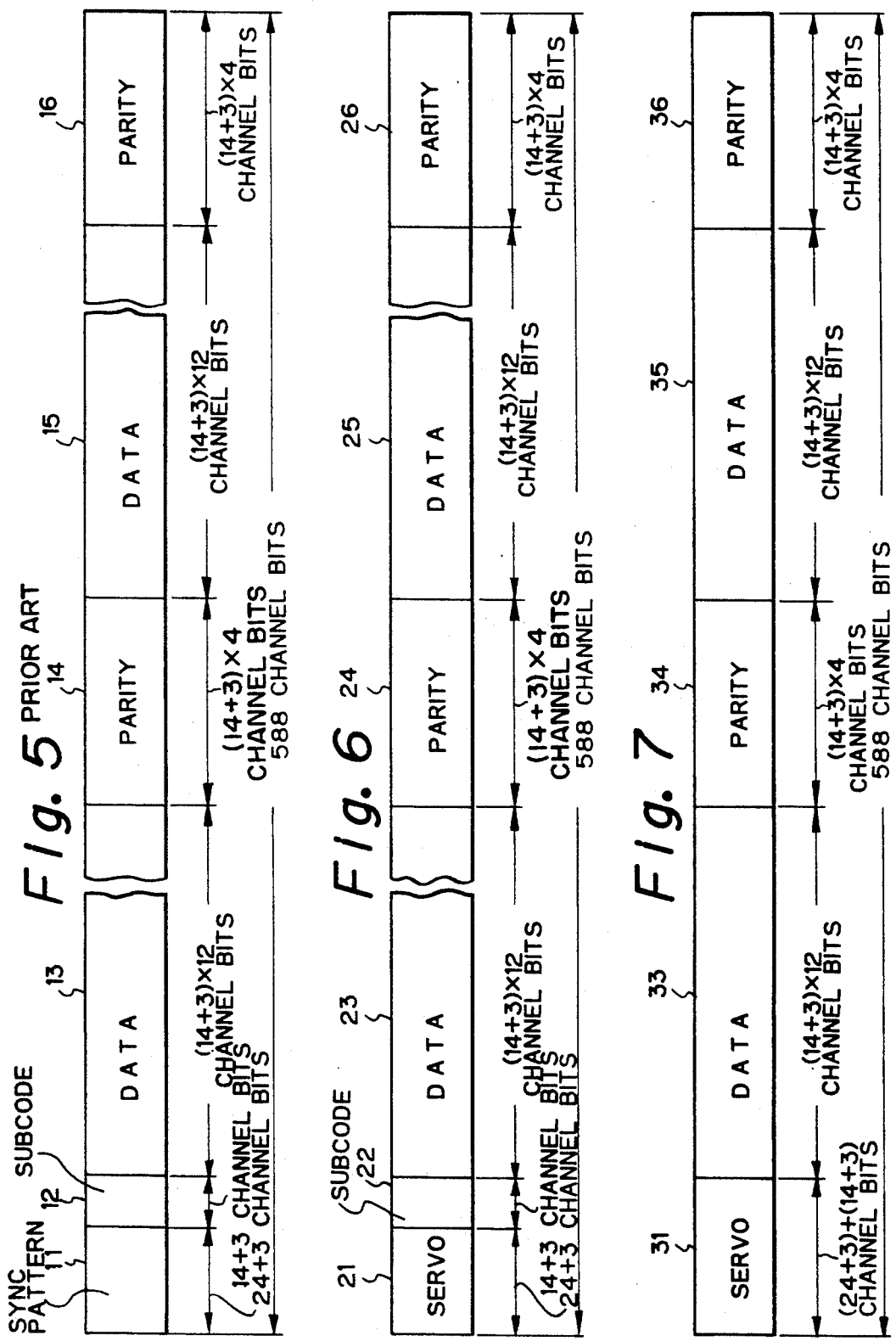

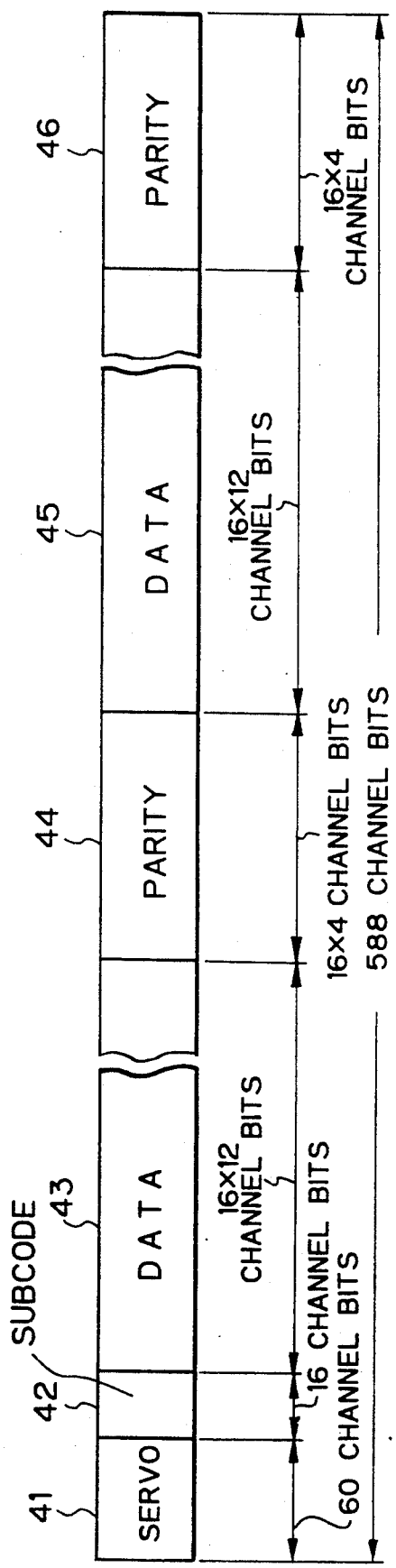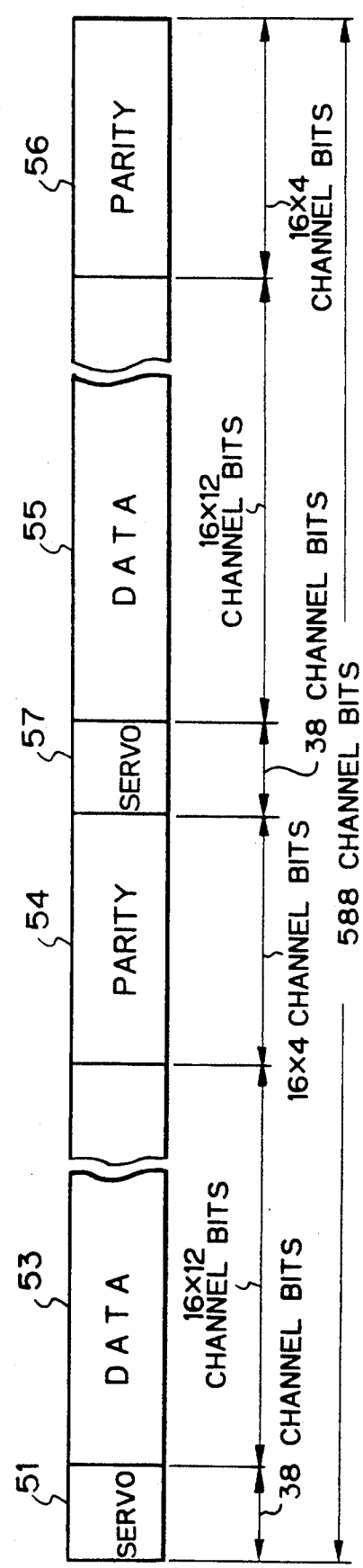

METHOD FOR RECORDING A CD-RAM WHICH IS COMPATIBLE WITH A CONVENTIONAL CD RECORDING FORMAT WHILE ALLOWING FAST ACCESSING

BACKGROUND OF THE INVENTION

1. Field of the Invention

This invention relates to a data recording method suitable for use in an erasable optical disc, especially an optical disc having compatibility with a CD format.

2. Description of the Prior Art

A CD (compact disc) using, for example, a magneto-optical disc as a recording medium and capable of recording and reproducing data has been proposed. Such a CD capable of recording and reproducing data is hereafter called called a CD-RAM. One of characteristics of a CD-RAM is compatibility of data with a CD-ROM which is only for use in playback of data or a CD-WO of a write once type.

In a CD-RAM, one subcode block in the CD format corresponds to one sector. One subcode block consists of 98 frames. Each sector is dealt with as a unit for recording and playback of data.

Note that an error correction code in an ordinary CD is not completed in one sector. Recording and playback of data on a sector-unit basis are therefore difficult. From this viewpoint, the inventor of the present application formerly proposed CIRC (cross interleave Reed Solomon code) of a sector completion type as disclosed in the specification of Japanese Patent Laid Open Publication No. Hei 1-287872 as being an error correction coding method by which data can be recorded and reproduced on the sector-unit basis.

There has been a proposal to perform tracking control by using a sample servo system in case that a magneto-optical disc is used as a recording medium. The sample servo system is known as using servo areas provided at intervals of a predetermined length which is obtained by dividing one sector into a plurality of segments (for example, in each segment), and using a playback signal of each servo area for tracking control.

In order to maintain a stable servo in the sample servo system, it is necessary to determine the interval between servo areas and the length of the servo area according to the rotation speed of a disc and the servo characteristics.

If, however, the interval between servo areas and the length of the servo area are simply determined, merely considering maintenance of a stable servo, error correction processing would be difficult when some defect occurs in servo areas. More specifically, when a defect occurs in a servo area, the level of a playback RF signal drops, and the data of the segment would become an error. If data of one segment extends over a plurality of error correction coding series, it is difficult to process such error in the data of one segment. This is explained in, for example, U.S. Pat. No. 4,907,215.

If maintenance of a stable servo alone is considered to determine the interval between servo areas and the length of the servo area, it would be difficult to establish compatibility of data with other CD variation discs such as CD-ROM, CD-WO, and so on.

In a CD-RAM, it is necessary to provide a sector address in order for data to be recorded in and reproduced from any desired sector. In an ordinary optical disc, a header area is provided, for example, in the leading segment in one sector so that the sector address is recorded in the header area. It is therefore considered that, also for a CD-RAM, the sector address may be recorded, for example, in the leading segment of one sector.

In a CD-RAM, however, one subcode block corresponds to one sector (98 frames) for maintaining compatibility of data. Therefore, the sector size is larger than an ordinary optical disc. In this case with a large sector size, if the sector address is recorded, for example, in the leading one segment alone of one sector, the latency time until the segment with the sector address recorded is reproduced is long, which causes an increase of the access time for reaching the desired sector.

OBJECTS AND SUMMARY OF THE INVENTION

It is, therefore, an object of the invention to provide a data recording method for not only maintaining stable servo but also improving the error correction processing performance and ensuring compatibility of data with other CD variation discs.

It is another object of the invention to provide a data recording method capable of accessing in a short time any desired sector even having a large sector size like a CD-RAM.

According to an aspect of the present invention, there is provided a method of recording user data on a CD-RAM disc medium comprising the steps of recording servo signals in a pair of spaced apart servo areas in each one of a predetermined number of segments which form a predetermined number of sectors of each one of a plurality of recording tracks on the disc medium, and recording along a portion of each track, between each servo area, units of 12 bytes of user data and 4 bytes of parities for the user data so that among the predetermined number of segments are a plurality of user data segments each consisting of a servo signal and one or more units of 12 bytes of user data and the parities for the 12 bytes of user data.

A preferred embodiment further includes the steps recording along each track among the predetermined number of segments, at predetermined intervals between the user data segments, address segments in which are recorded sector address signals. The step of recording the address segments includes the steps of recording in each address segment, between the servo areas, a sector mark, a sector number, a parity for the sector number, a sector mark, a sector number, a parity for the sector number, and a laser control signal. In the preferred embodiment, the signals are recorded so that the predetermined number of segments is two hundred and the data length of each segment is 18.375 bytes.

This arrangement conforms to the conventional CD recording format and yet allows maintenance of a stable servo while improving error correction processing performance and access time to any desired sector.

In the preferred embodiment only a single unit of 12 bytes of user data and 4 bytes of the parities for the user data is recorded between each servo area. In alternative embodiments, two units of 12 bytes of user data and 4 bytes of the parities for the user data, i.e. a total of 32 bytes, are sequentially recorded between each servo area and a subcode is recorded in each segment.

The above, and other, objects, features and advantage of the present invention will become readily apparent from the following detailed description thereof which is

BRIEF DESCRIPTION OF THE DRAWINGS

FIGS. 3A, 3B, 3C and 3D present schematic views showing a recording format of a CD-RAM to which the invention is applied, wherein FIG. 3A represents the format of one track, FIG. 3B represents the format of one sector, FIG. 3C represents the format of an address segment, and FIG. 3D represents the format of one user data segment.

FIG. 5 is a schematic view of the format of a frame of data in a conventional CD recording format;

FIG. 6–9, inclusive, are schematic views of frames of data as formatted according to alternative embodiments of the invention.

DETAILED DESCRIPTION OF THE PREFERRED EMBODIMENTS

Figure 1:
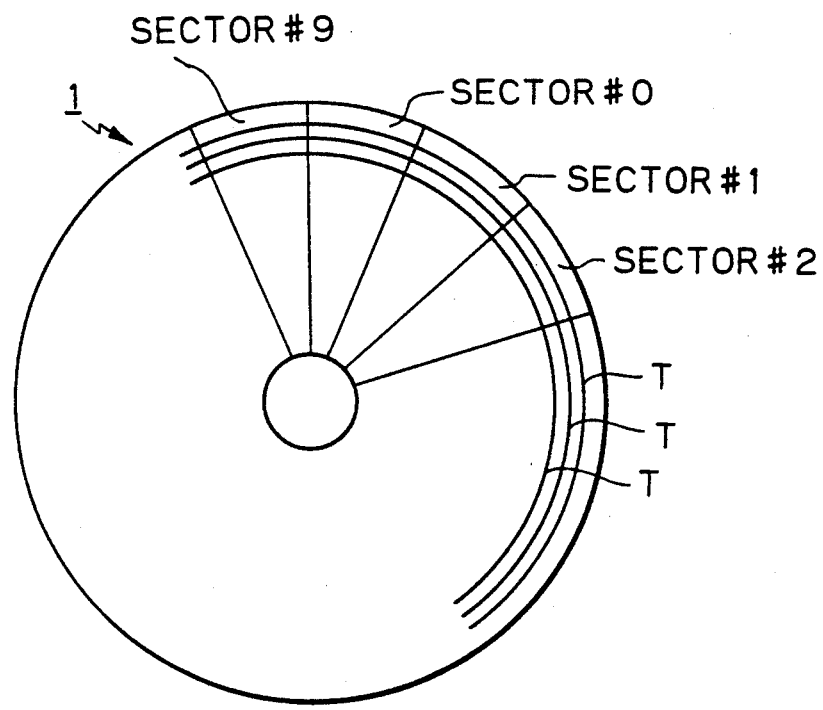
FIG. 1 is a plan diagram for use in explaining of a CD-RAM to which the invention is applied.

In order to realize a CD-RAM of a sample servo system, factors to be considered for layout of servo areas are not only maintenance of stable servo but also easy error correction upon occurrence of an error in a servo area and compatibility of data with other CD variations.

In order to facilitate error correction when a defect occurs in a servo area, it is essential that data in one segment do not extend over a plurality of error correction coding series. In a recording format for a CD, data is developed in a frame structure, and it undergoes error correction coding. Therefore, if one frame corresponds to one segment, data in one segment is completed in one error correction coding series, which facilitates error correction processing when a defect occurs in the servo area. It is therefore considered to establish correspondence between one frame and one segment.

FIG. 5 shows a data arrangement of one frame in an ordinary CD. On the CD is recorded data, with one byte (8 bits) being converted into 14 channel bits by EFM (Eight to Fourteen Modulation). Between respective bytes are interposed merging bits of 3 channel bits for suppressing DC components.

As shown in FIG. 5, the normal CD recording format contains a sync pattern area 11 of (24+3) channel bits located at the head of one frame, and a subcode area 12 of (14+3) channel bits (corresponding to data of one byte) subsequent to the sync pattern area 11. They are followed by a user data area 13 of ((14+3)×12) channel bits (corresponding to data of 12 bytes) and a parity area 14 of ((14+3)×4) channel bits (corresponding to a parity of 4 bytes). They are further followed by a user data area 15 of ((14+3)×12) channel bits and a parity area 16 of ((14+3)×4) channel bits.

As a result, the contents of one frame are:

| | |
|---|---|
| sync pattern | (24 + 3) channel bits; |
| subcode | (14 + 3) channel bits; |
| user data | (14 + 3) × 12 channel bits; |
| parity | (14 + 3) × 4 channel bits; |
| user data | (14 + 3) × 12 channel bits; and |
| parity | (14 + 3) × 4 channel bits |
| Total | 588 channel bits |

Consideration must begiven regarding a possible area in the data of this one frame in which the servo area may be provided. In the sample servo system, a clock is reproduced by using a playback signal from a clock playback pit in the servo area. Therefore, the sync pattern area 11 may be omitted, and may be used as a servo byte.

If a sector address is recorded, the subcode may be omitted. The subcode area 12 may therefore be used as a servo byte.

FIG. 6 shows an example of a frame structure of a CD-RAM in which the sync pattern area 11 in the ordinary CD format is used as a servo area 21.

More specifically, in FIG. 6, the servo area 21 of (24+3) channel bits is located at the beginning of one frame. The servo area 21 is followed by a subcode area 22 of (14×3) channel bits (corresponding to data of one byte). This is further followed by a user data area 23 of ((14 +3)×12) channel bits (corresponding to data of 12 bytes) and a parity area 24 of ((14+3)×4) channel bits (corresponding to a parity of 4 bytes). They are further followed by a user data area 25 of ((14+3)×12) channel bits and a parity area 26 of ((14+3)×4) channel bits.

With this arrangement, one segment corresponds to one frame, which facilitates error correction upon occurrence of a defect in a servo area and ensures compatibility with other CD variations. In this case, a servo area of 27 channel bits (corresponding to 1.59 bytes) is ensured for a user data and parities of 561 channel bits (corresponding to 33 bytes).

FIG. 7 shows an example of frame structure of a CD-RAM in which the sync pattern area 11 and the subcode area 12 in the ordinary CD format are used as a servo area 31.

More specifically, still referring to FIG. 7, the servo area 31 of ((24+3)+(14+3)) channel bits is provided at the beginning of one frame. The servo area 31 is followed by a user data area 33 of ((14+3)×12) channel bits (corresponding to data of 12 bytes) and a parity area 34 of ((14+3)×4) channel bits (corresponding to a parity of 4 bytes). They are further followed by a user data area 35 of ((14+3)×12) channel bits and a parity area 36 of ((14+3)×4) channel bits.

In this case, a servo area of 44 channel bits (corresponding to 2.59 bytes) is ensured for a user data and parities of 544 channel bits (corresponding to 32 bytes).

The foregoing examples employ EFM of data like an ordinary CD. Since, however, EFM requires merging bits of three bits to be provided between respective bytes for suppressing DC components, it limits improvement of the recording density. From this viewpoint, a modulation system which converts one byte into 16 channel bits and does not require merging bits for suppressing DC components has been proposed (U.S. Patent Appl. Ser. No. 603932/1990, abandoned). This modulation system is called ESM.

FIG. 8 shows an example of frame structure of a CD-RAM in which the sync pattern area 11 is used as a servo area 41 when ESM is employed.

More specifically, in FIG. 8, the servo area 41 of 60 channel bits is located at the beginning of one frame. The servo area 41 is followed by a subcode area 42 of 16 channel bits (corresponding to data of 1 byte). This is followed by a user data area 43 of (16×12) channel bits (corresponding to data of 12 bytes) and a parity area 44 of (16×4) channel bits (corresponding to a parity of 4 bytes). They are further followed by a user data area 45 of (16×12) channel bits and a parity area 46 of (16×4) channel bits.

In this case, a servo area of 60 channel bits (corresponding to 3.75 bytes) is ensured with respect to user to data and parities of 528 channel bits (corresponding to 33 bytes).

FIG. 9 shows an example of frame structure of a CD-RAM in which the sync pattern area 11 and the subcode area 12 are used as servo areas 51 and 57 when ESM is employed. In this example, one frame is divided into two equal parts, and the servo areas 51 and 57 are provided, respectively, in these parts.

More specifically, still referring to FIG. 9, the servo area 51 of 38 channel bits is provided at the beginning of one frame. The servo area 51 is followed by a user data area 53 of (16×12) channel bits (corresponding to data of 12 bytes) and a parity area 54 of (16×4) channel bits (corresponding to a parity of 4 bytes). Further provided are a servo area 57 of 38 channel bits, a user data area 55 of (16×12) channel bits, and a parity area 56 of (16×4) channel bits.

One frame in the CD recording format includes the same patterns of data and parities. Therefore, if one frame is divided into two equal parts and the servo areas 51 and 57 are disposed, respectively, in these parts the respective segments have the same structure. More specifically, in FIG. 9, servo area 51, user data area 53 and parity area 54 form one segment whereas servo area 57, user data area 55 and parity area 56 form the other segment. These two segments have the same structure.

In this case, a servo area of 38 channel bits (corresponding to 2.375 bytes) is ensured for user data and a parity of 256 channel bits (corresponding to 16 bytes) in each segment. Since a servo area of two or more bytes is ensured in 16 bytes, stable servo control can be performed.

FIG. 1 shows an arrangement of a CD-RAM to which the invention is applied. The CD-RAM 1 uses a magnetooptical disc as a recording medium. The appearance of the CD-RAM 1 is substantially the same as an ordinary compact disc.

The CD-RAM 1 is provided with spiral or annular tracks T. Data is recorded in the form of arrays of magneto-optical pits (orientation of magnetization of a vertically magnetized film) along the tracks T. The CD-RAM 1 is rotated at CAV (constant angular velocity) or CLV (constant linear velocity).

Data is recorded on or reproduced from the CD-RAM 1 for each sector (corresponding to each subcode block in an ordinary CD), namely sectors, #0, #1, #2, .... The modulation system used is ESM. The error correction code used is a CIRC of a sector completion type.

Figure 2:
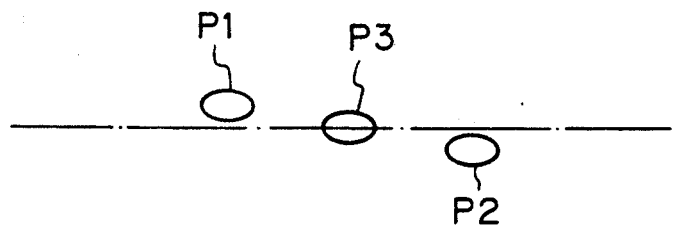
FIG. 2 is a schematic view used for explanation of a servo area.

The tracking system used for the CD-RAM 1 is a sample servo system. More specifically, as illustrated in FIG. 3B, one sector is further divided into a plurality of segments SG0, SG1, SG2, ..., and a servo area is provided in each segment. As shown in FIG. 2, each servo area includes servo pits P1 and P2 similarly offset from the track center, and a clock playback pit P3. The levels of playback signals from the servo pits P1 and P2 are used to effect a tracking servo. A playback signal of the clock playback pit P3 forms a clock which is used to record or reproduce data.

A recording format of the CD-RAM is explained in greater detail.

FIG. 3 shows an example of a recording format for the CD-RAM 1. This example corresponds to the example shown in FIG. 9.

Figure 3A:
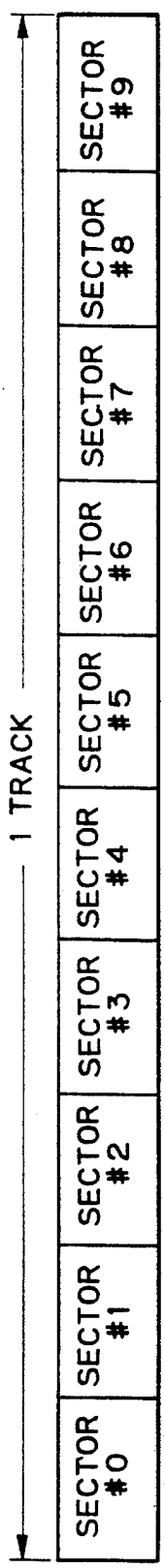
Figure 3B:
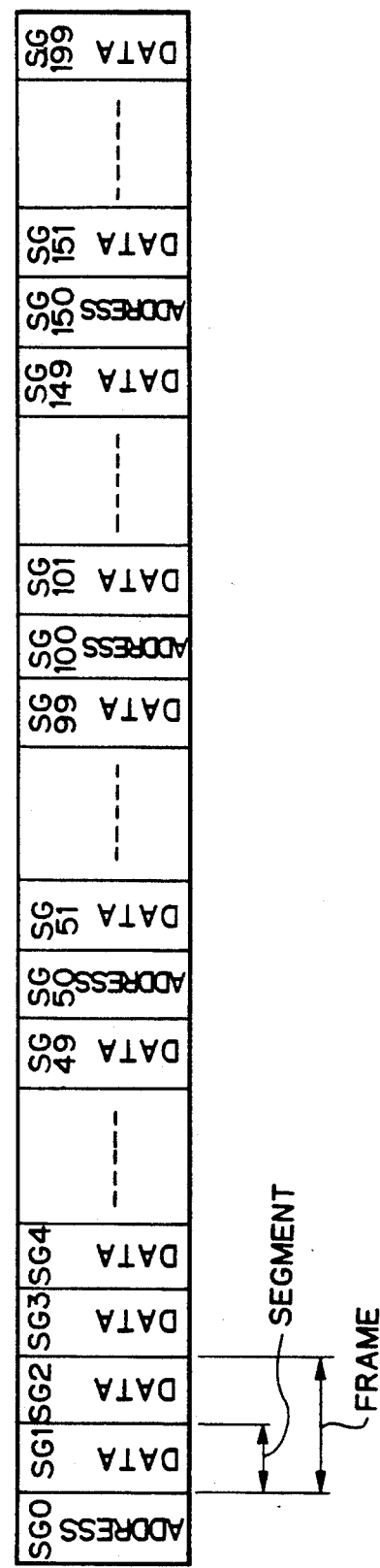

More specifically, as shown in FIG. 3A, one track is divided into, for example, 10 sectors #0, #1, #2, ... and #9. As shown in FIG. 3B, each of the sectors #0, #1, #2, ... and #9 is divided into two hundred segments SG0, SG1, SG2, SG3, ... and SG199. One segment corresponds to ½ frame.

One subcode block, i.e. one sector, consists of 98 frames in a CD, and one frame consists of two segments. If this relationship alone is considered, the result would be such that one sector be divided into 196 segments. In this example, however, since the servo area is allotted also to the subcode area, a sector address must be provided. The sector address may be located within the servo area. In this example, however, four separate address segments are provided with the sector in order to ensure high-speed, reliable detection of the sector address. As a result, one sector consists of (196+4=200) segments.

Among these segments, segment SG0, segment SG50, segment SG100 and segment SG150 are used for the address, and the sector address is recorded in each address segment. The remaining 196 segments (98 frames) SG1, SG2, ..., SG49, SG51, ..., SG99, SG101, ..., SG149, SG151, ..., SG199) are used for recording user's data.

In this example, address segments SG0, SG50, SG100, and SG150 are provided in different separate locations. Locating address segments SG0, SG50, SG100, and SG150 in separate locations contributes to reduction of the latency time upon detection of the sector address.

FIG. 3C shows an arrangement for address segments SG0, SG50, SG100, and SG150. As shown in FIG. 3C, the first area of 2.375 bytes of the address segment is used as a servo area 61. This is followed by a sector mark area 62 of one byte, a sector number area 63 of 3 bytes, a parity area 64 of 2 bytes, a sector mark area 65 of one byte, a sector number area 66 of 3 bytes, and a parity area 67 of 2 bytes. Data is recorded in these areas of 12 bytes in the form of embossed pits. A subsequent area of 4 bytes is a laser control area 68.

FIG. 3D shows an arrangement for data segments. As shown in FIG. 3D, the first area of 2.375 bytes of the data segment is used as a servo area 71. This is followed by a user data area 72 of 12 bytes. A subsequent area of 4 bytes is a parity area 73.

Figure 4:
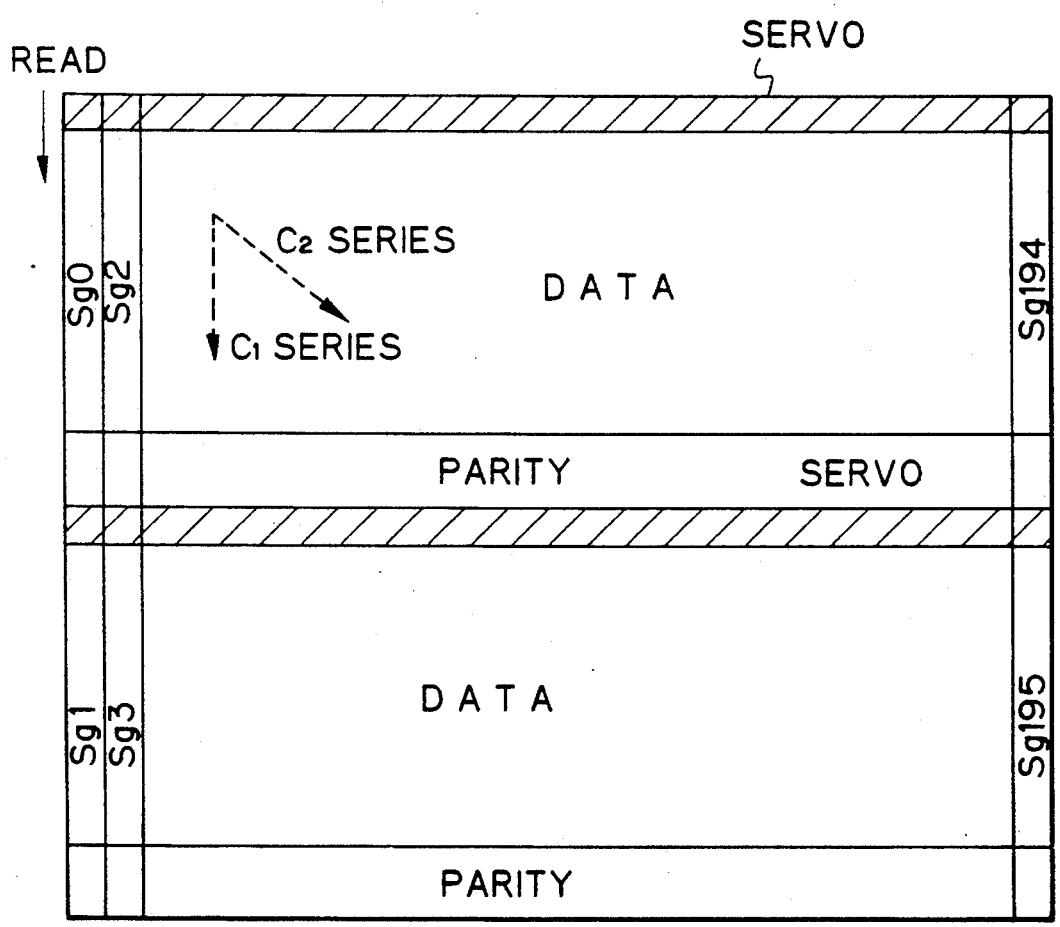
FIG. 4 is a schematic view used for explanation of error correction coding in a CD-RAM to which the invention is applied.

In case that data is recorded or reproduced in the aforementioned format, error correction coding processing is carried out by using CIRC of a sector completion type as shown in FIG. 4.

Segments SG1, SG2, SG3, ... excluding address segments are designated by sg0, sg1, sg2, .... In case that error correction coding processing is carried out by using CIRC of a sector completion type, respective data in data segments sg0, sg1, sg2, ... and sg195 are arranged in a two-dimensional layout. Error correction coding processing is carried out for both the C1 series and the C2 series.

When a defect occurs in a servo area, the playback RF signal level drops, and the data of the segment becomes an error. As shown in FIG. 4, since the data of one segment is completed in one error correction coding series, error information can be returned for each ½ frame unit, which facilitates management on subsequent error correction.

This recording format, in which respective segments have similar structures and two segments make one frame, is suitable for overwriting data or recording associated data. For example, still referring to FIG. 4, if Japanese language data is recorded in upper located segments (even number segments) and English language data in lower located segments (odd number segments), sound multiplex processing is facilitated.

Further, if error correction coding processing is effected fully independently for upper located segments and for lower located segments, upper located segments and lower located segments can be processed as being fully independent data.

Additionally, since this recording format scrambles each segment as a unit, appropriate correspondence is maintained between physical format processing and logic format processing.

According to the invention, the number of predetermined pattern made of data and parities (but excluding; a sync pattern and a subcode of the ordinary CD for mat) and; one segment have such a relationship that one of them is an integer multiple of the other, e.g. two to the Therefore, in the CD-RAM format of the present invention, compatibility with other CD variation discs is held, and data of one segment does not extend over two error correction processing series, which facilitates management on error correction upon occurrence of a defect in a servo area.

According to another aspect of the invention, the length of a predetermined pattern made of subcodes, data and parities excluding a sync pattern in an ordinary CD and the length of one segment have such a relationship that one of them is an integer multiple of the other, and the arrangement of data in one segment represents a predetermined pattern made of a subcode, data and a parity. Therefore, compatibility with other CD variation discs is held, and data of one segment does not extend over two error correction processing series, which facilitates management on error correction upon occurrence of a defect in a servo area.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method of recording user data on a CD-RAM disc medium comprising the steps of:
    recording servo signals in a pair of spaced apart servo areas in each one of a predetermined number of segments which form a predetermined number of sectors of each one of a plurality of recording tracks on the disc medium; and
    recording along a portion of each track, between each servo area, units of 12 bytes of user data and 4 bytes of parities for the user data so that among the predetermined number of segments are a plurality of user data segments each consisting of a servo signal and one or more units of 12 bytes of user data and the parities for the 12 bytes of user data.

2. A method as claimed in claim 1, further comprising the steps of:
    recording along each track among the predetermined number of segments, at predetermined intervals between the user data segments, address segments in which are recorded sector address signals.

3. A method as claimed in claim 2, wherein the step of recording the address segments comprises the steps of:
    recording in each address segment, between the servo areas, a sector mark, a sector number, a parity for the sector number, a sector mark, a sector number, a parity for the sector number, and a control signal.

4. A method as claimed in claim 1, wherein the predetermined number of segments is two hundred.

5. A method as claimed in claim 1, wherein the data length of each segment is 18.375 bytes.

6. A method as claimed in claim 1, wherein during the step of recording the user data, only a single unit of 12 bytes of user data and the parities for the user data is recorded between each servo area.

7. A method as claimed in claim 1, wherein during the step of recording the user data, two units of 12 bytes of user data and the parities for the user data are sequentially recorded between each servo area.

8. A method as claimed in claim 1, further comprising the step of recording a subcode in each segment.

* * * * *